(12) United States Patent
Meier et al.

(10) Patent No.: US 11,459,711 B2
(45) Date of Patent: Oct. 4, 2022

(54) SOIL PROCESSING MACHINE

(71) Applicant: Hamm AG, Tirschenreuth (DE)

(72) Inventors: Matthias Meier, Tirschenreuth (DE); Christopher Prechtl, Falkenberg (DE)

(73) Assignee: HAMM AG, Tirschenreuth (DE)

( * ) Notice: Subject to any disclaimer, the term of this patent is extended or adjusted under 35 U.S.C. 154(b) by 236 days.

(21) Appl. No.: 16/713,249

(22) Filed: Dec. 13, 2019

(65) Prior Publication Data
US 2020/0190750 A1    Jun. 18, 2020

(30) Foreign Application Priority Data

Dec. 17, 2018   (DE) ...................... 10 2018 132 377.8

(51) Int. Cl.
*E01C 19/26*     (2006.01)
*E01C 19/28*     (2006.01)
(Continued)

(52) U.S. Cl.
CPC ............ *E01C 19/281* (2013.01); *B60D 1/145* (2013.01); *B60G 17/08* (2013.01); *B62D 12/00* (2013.01); *B62D 55/084* (2013.01); *E01C 19/255* (2013.01); *E01C 19/266* (2013.01); *E01C 19/282* (2013.01); *E01C 21/00* (2013.01); *B60G 2500/30* (2013.01)

(58) Field of Classification Search
CPC ...... E01C 19/23; E01C 19/266; E01C 19/281; E01C 2301/00
USPC .............................................. 404/85, 86, 128
See application file for complete search history.

(56) References Cited

U.S. PATENT DOCUMENTS 2,585,117 A *  2/1952 Gurries ................... E02D 3/026
                                                       404/86
2,830,511 A *  4/1958 Wills ..................... E01C 19/238
                                                       404/86
(Continued)

FOREIGN PATENT DOCUMENTS

CA          3027576      12/2017
CN         203905071     10/2014
(Continued)

OTHER PUBLICATIONS

European Search Report filed in EP 19214669 dated Apr. 17, 2020.
(Continued)

*Primary Examiner* — Gary S Hartmann
(74) *Attorney, Agent, or Firm* — Rankin, Hill & Clark LLP

(57) ABSTRACT

A soil processing machine includes a machine frame having two longitudinal members positioned parallel to a machine longitudinal direction and spaced from each other transversely to the machine longitudinal direction, and two transverse members positioned extending transversely to the machine longitudinal direction and spaced from each other in the machine longitudinal direction. A soil processing roller is supported on the longitudinal members such as to be rotatable about a roller rotational axis and positioned between the transverse members in the machine longitudinal direction. A coupling assembly couples the machine frame to another machine frame of the soil processing machine or to another machine. A chassis assembly includes at least one height-adjustable chassis unit supported on the machine frame.

19 Claims, 7 Drawing Sheets

(51) Int. Cl.
*B60D 1/145* (2006.01)
*B60G 17/08* (2006.01)
*B62D 12/00* (2006.01)
*B62D 55/084* (2006.01)
*E01C 19/25* (2006.01)
*E01C 21/00* (2006.01)

(56) References Cited

U.S. PATENT DOCUMENTS

| | | | | |
|---|---|---|---|---|
| 2,986,977 A * | 6/1961 | Swenson | ............... | E01C 19/266 404/85 |
| 3,867,052 A | 2/1975 | Durham | | |
| 3,895,880 A * | 7/1975 | Fink | ............... | E01C 19/266 404/86 |
| 3,950,110 A * | 4/1976 | Clifford | ............... | E02D 3/026 404/124 |
| 3,966,346 A * | 6/1976 | Berrange | ............... | E02D 3/026 404/124 |
| 3,986,782 A | 10/1976 | Durham | | |
| 3,989,404 A * | 11/1976 | Burton | ............... | E01C 19/266 404/128 |
| 4,056,328 A * | 11/1977 | Maxey | ............... | E01H 4/00 404/96 |
| 4,147,448 A * | 4/1979 | Jeffery | ............... | E02D 3/046 172/518 |
| 4,193,710 A * | 3/1980 | Pietrowski | ............... | E01C 19/266 172/518 |
| 4,647,247 A | 3/1987 | Sandström | | |
| 5,464,066 A * | 11/1995 | Doucet | ............... | A01B 31/00 172/1 |
| 5,533,283 A * | 7/1996 | Roth | ............... | E01C 19/235 172/799.5 |
| 5,676,490 A * | 10/1997 | Nelson | ............... | E01C 23/0993 299/39.4 |
| 6,113,309 A * | 9/2000 | Hollon | ............... | E01C 19/006 180/20 |
| 6,708,777 B1 * | 3/2004 | Holmes | ............... | A01B 29/045 172/547 |
| 7,100,703 B2 * | 9/2006 | Etter | ............... | A01B 29/06 172/315 |
| 7,410,323 B1 * | 8/2008 | Roth | ............... | E01C 19/235 404/132 |
| 7,614,821 B2 * | 11/2009 | Stromsoe | ............... | E02D 3/026 404/126 |
| 9,988,774 B2 * | 6/2018 | Howe | ............... | E01C 23/127 |
| 10,400,412 B2 * | 9/2019 | Stromsoe | ............... | E01C 19/235 |
| 11,124,928 B2 * | 9/2021 | Eiden | ............... | E01C 19/1036 |
| 2010/0098521 A1 * | 4/2010 | Kartal | ............... | E01C 19/281 414/680 |
| 2018/0002882 A1 * | 1/2018 | Stromsoe | ............... | E01C 21/00 |
| 2019/0323193 A1 * | 10/2019 | Stromsoe | ............... | E01C 19/264 |
| 2020/0190749 A1 * | 6/2020 | Meier | ............... | B62D 55/084 |

FOREIGN PATENT DOCUMENTS

| | | |
|---|---|---|
| CN | 201059157 | 12/2014 |
| CN | 205152765 | 4/2016 |
| DE | 202014000024 | 2/2014 |
| EP | 0053598 | 6/1982 |
| EP | 2142706 | 1/2010 |

OTHER PUBLICATIONS

China National Intellectual Property Administration, Search Report for Chinese Application No. 201911273720.4, dated May 12, 2021, 3 pages.

* cited by examiner

SOIL PROCESSING MACHINE

BACKGROUND OF THE INVENTION

The present invention relates to a soil processing machine, comprising a machine frame having two longitudinal members disposed spaced from each other transversely to a machine longitudinal direction, extending substantially in the machine longitudinal direction, and two transverse members disposed spaced from each other in the machine longitudinal direction, extending substantially transversely to the machine longitudinal direction, a soil processing roller rotatably supported about a roller rotational axis in the machine longitudinal direction between the transverse members on the longitudinal members, a coupling assembly for coupling the machine frame to another machine frame of the soil processing machine or to another machine, and a chassis assembly.

Such a soil processing machine is known from EP 2 142 706 B1. This known soil processing machine comprises a machine frame, which can be attached to a traction machine by means of a coupling assembly comprising a drawbar unit and can be pulled by this over the soil to be compacted with the compactor roller resting on the soil. A chassis assembly provided in this known soil processing machine comprises a rotatably supported wheel on each of the two longitudinal members of the machine frame. In a transfer operation state, in which the soil processing roller is not intended to compact the soil but the soil processing machine is to be towed to the soil to be compacted, in order to allow the soil processing roller not to be in contact with the soil, and so that the soil processing machine can roll on the wheels rotatably supported on the longitudinal members, a mechanism is provided by which the soil processing roller can be raised or lowered with respect to the machine frame.

It is the object of the present invention to provide a soil processing machine which has increased versatility in soil processing operation.

BRIEF SUMMARY OF THE INVENTION

According to the invention, this object is achieved by a soil processing machine, comprising:
- a machine frame having two longitudinal members disposed spaced from each other transversely to a machine longitudinal direction, extending substantially in the machine longitudinal direction, and two transverse members disposed spaced from each other in the machine longitudinal direction, extending substantially transversely to the machine longitudinal direction,
- a soil processing roller rotatably supported about a roller rotational axis in the machine longitudinal direction between the transverse members on the longitudinal members,
- a coupling assembly for coupling the machine frame to another machine frame of the soil processing machine or to another machine,
- a chassis assembly.

This soil processing machine is characterised in that the coupling assembly comprises at least one height-adjustable chassis unit supported on the machine frame.

In the construction of a soil processing machine according to the invention, the soil processing roller is rotatably supported on the machine frame, in particular the longitudinal members thereof. In order to be able to bring the soil processing roller into or out of contact with the soil to be processed and in particular to be able to vary the load exerted on the soil by the soil processing roller, it is provided in the construction according to the invention that the chassis assembly or the at least one chassis unit thereof is height-adjustable with respect to the machine frame rotatably supporting the soil processing roller. This makes it possible, in particular if a plurality of chassis units are provided, to set each chassis unit individually to its height position and thus compensate for differences in level in the soil by corresponding adjustment of the height position thereof with respect to the machine frame rotatably supporting the soil processing roller. This is especially of particular importance when, in the soil processing operation, the soil processing machine not only rests on the soil by means of the soil processing roller, but also with the chassis unit, so that it bears a part of the weight of the soil processing machine for adjusting the load exerted on the soil.

According to a particularly advantageous embodiment, the chassis assembly may comprise in association with each longitudinal member a height-adjustable chassis unit supported on the longitudinal member. The chassis units are thus disposed in lateral regions and do not substantially come into contact with the soil region to be processed during a crossover. In particular, it can also be provided for this purpose that the chassis assembly comprises a chassis unit on both sides of the processing roller with respect to the machine longitudinal direction, so that the chassis units transverse to the machine longitudinal direction, i.e. in the direction of the roller axis of rotation, accommodate the soil processing roller between them or are disposed following the soil processing roller. Such an assembly further ensures that the weight or a substantial part of the weight of the soil processing roller can be accommodated in the transfer operation by the chassis assembly. For the above-mentioned compensation of differences in level of the processed soil, it is proposed that the chassis assembly comprises a plurality of mutually independently height-adjustable chassis units.

In order to ensure a stable, reliably acting height adjustment, it is proposed that each chassis unit is pivotally coupled in a coupling region to the associated longitudinal member and height-adjustably supported in a height adjustment region disposed spaced in the machine longitudinal direction with respect to the coupling region via a height adjustment assembly with respect to the associated longitudinal member.

The height adjustment assembly may comprise, for example, a piston/cylinder unit or a spindle unit.

The chassis unit may comprise a chassis support pivotally coupled to the longitudinal member in the coupling region and coupled to the height adjustment assembly in the height adjustment region.

In order to be able to achieve a uniform support of the weight of the soil processing roller in the region of each chassis unit, it is proposed that each chassis unit has a soil processing machine footprint region extending in the machine longitudinal direction, and that the rotational axis of the roller is positioned in the machine longitudinal direction between a first footprint region longitudinal end and a second footprint region longitudinal end.

A low surface load can be achieved by the chassis assembly if each chassis unit comprises a caterpillar chassis.

In order to be able to achieve motion compensation between the caterpillar chassis assigned to the various chassis units during motion over an uneven soil, it is proposed that the caterpillar chassis is substantially freely pivotally coupled to the chassis member.

To reinforce the soil processing action of the soil processing roller, it may be assigned to an oscillation mechanism having at least one imbalance mass disposed in the interior of the soil processing roller and rotatable about an imbalance axis of rotation. Such an oscillation mechanism may, for example, be a vibration mechanism with which the soil processing roller is subjected to a force that accelerates it periodically in a direction substantially orthogonal to the rotational axis of the roller, in particular substantially in the vertical direction.

In order to achieve this periodic force, the at least one imbalance mass can be assigned an imbalance drive.

In particular, when pressure fluid or a pressure fluid circuit is available to the soil processing machine, the imbalance drive may comprise an imbalance pressure fluid drive having a pressure fluid pump and a pressure fluid motor coupled to the pressure fluid pump via a pressure fluid circuit.

In alternative embodiment, which does not involve a transmission of the drive energy via a pressure fluid, it can be provided that the imbalance drive comprises a mechanical transmission mechanism transmitting a drive torque from a drive motor to the at least one imbalance mass, preferably comprising a belt drive.

The chassis assembly may be assigned to a chassis drive for driving the soil processing machine in the machine longitudinal direction for an autonomous or assisted driving operation.

Here too, when pressure fluid is available to the soil processing machine, the chassis drive may comprise a chassis pressure fluid drive having a pressure fluid pump and a pressure fluid motor coupled to the pressure fluid pump via a pressure fluid circuit.

The soil processing machine may be coupled to a traction machine for motion in the machine longitudinal direction by means of the coupling assembly. Within the context of the present invention, in this embodiment, the soil processing machine is therefore not a self-propelled soil processing machine which can be operated autonomously, i.e. decoupled from the traction machine, even if the soil processing machine has a chassis drive, which is operated, for example, supportive if the soil processing machine is moved by a traction machine.

In order to achieve a stable, but nevertheless easy to achieve coupling with the traction machine, it is proposed that the coupling assembly comprises a drawbar unit preferably rigidly connected to the machine frame and has a coupling formation, preferably a coupling socket, for coupling to a counter-coupling formation provided on the traction machine, preferably a coupling ball. The coupling formation and the counter-coupling formation can therefore thus interact in the manner of a ball-head coupling.

In order to be able to provide the energy for driving an imbalance mass in such an embodiment in a simple manner, the imbalance drive can be coupled to a drive unit of the traction machine. The chassis drive can also be coupled to a drive unit of the traction machine, so that no drive unit, for example in the form of an internal combustion engine or the like, needs to be provided on the soil processing machine itself.

In an alternative embodiment, in which, in the context of the present invention, the soil processing machine is designed as a self-propelled machine, a drive unit may be provided on the further machine frame providing a rear of the soil processing machine, and the coupling assembly may comprise a steering articulation assembly for pivotally coupling the machine frame providing at least a part of a front end of the soil processing machine to the further machine frame about a steering pivot axis. In such a soil processing machine, also referred to as a compactor, wheels driven on the rear or another soil processing roller driven for rotation, for example, may be provided for moving it in the machine longitudinal direction. A control station for an operator operating the soil processing machine may also be provided at the rear.

The invention further relates to a soil processing train, comprising a traction machine and a soil processing machine coupled to the traction machine, as previously described as a non-self-propelled soil processing machine.

The invention further relates to methods for operating a soil processing machine, in particular a soil processing machine constructed according to the invention, the soil processing machine comprising a soil processing roller rotatably supported on a machine frame about a rotational axis of the roller, an oscillation mechanism assigned to the soil processing roller, having at least one imbalance mass disposed in the interior of the soil processing roller rotatable about an imbalance rotational axis and a lifting assembly, wherein the soil processing roller is positionable in and out of contact with a soil underlying the soil processing roller by the lifting assembly and/or a bearing load exerted by the soil processing roller on the soil underlying the soil processing roller is variable, wherein the method comprises the measures:
a) at the beginning of a soil processing procedure, operating the lifting assembly to position the soil processing roller in such a way that it is out of contact with the soil underlying it or a bearing load exerted by it on the underlying soil is reduced with respect to a maximum bearing load,
b) after implementing measure a), putting the oscillation mechanism into operation,
c) after implementing measure b), operating the lifting assembly in such a way that the soil processing roller comes into contact with the underlying soil or a bearing load exerted by the soil processing roller on the underlying soil is increased, and/or wherein the method comprises at least one of the following measures:
d) for performing a soil processing procedure with the oscillation mechanism in operation, operating the lifting assembly in such a way that a bearing load exerted by the soil processing roller on the underlying soil is reduced with respect to a maximum bearing load,
e) while performing a soil processing procedure with the oscillation mechanism in operation, operating the lifting assembly in such a way that a bearing load exerted by the soil processing roller on the underlying soil is changed with respect to a maximum bearing load.

With the measures a) to c), it becomes possible, at the beginning of a soil processing procedure, to first put the soil processing machine or the oscillation mechanism thereof into operation, without the soil processing roller being n contact or substantial contact with the underlying soil. Since in this phase no or substantially no energy provided in the oscillation mechanism is introduced into the soil from the soil processing roller and thus dissipated, the energy required to bring the oscillation mechanism into its desired operating state, that is, for example, to achieve a specific desired rotational speed of the at least one imbalance mass, can be significantly decreased, or this desired operating state can be achieved more quickly.

The measures d) and e), which are alternative or additional to measures a) to c) and feasible alternatively or in combination, make it possible to change or adjust the interaction of the soil processing roller in the soil processing operation with the soil to be processed by it, so that the energy introduced into the soil is correspondingly changed or adjusted and, accordingly, the result of the soil processing procedure is changeable or adjustable. The operating characteristics of the soil processing roller can thus be adapted to the nature of the soil to be processed.

In order to be able to move the soil processing roller in a simple manner over the soil to be processed in the course of such a processing procedure, the lifting assembly may comprise a chassis assembly.

BRIEF DESCRIPTION OF THE DRAWINGS

The present invention will be described in detail below with reference to the accompanying figures. In which.

DETAILED DESCRIPTION OF THE INVENTION

Figure 1:
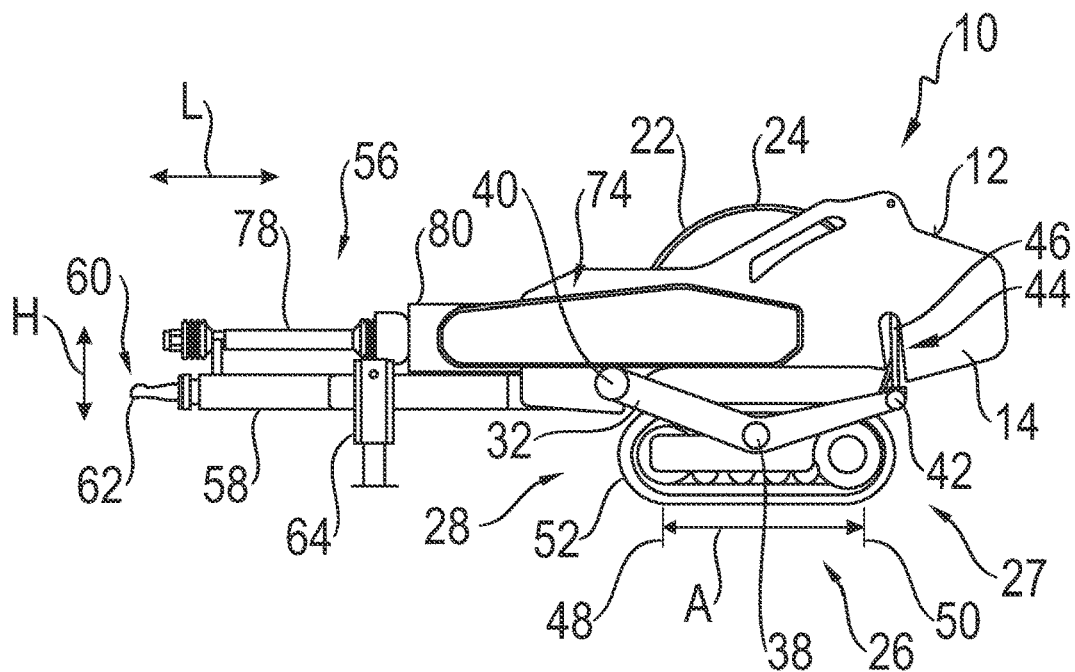
FIG. 1 shows a side view of a non-self-propelled soil processing machine.
Figure 2:
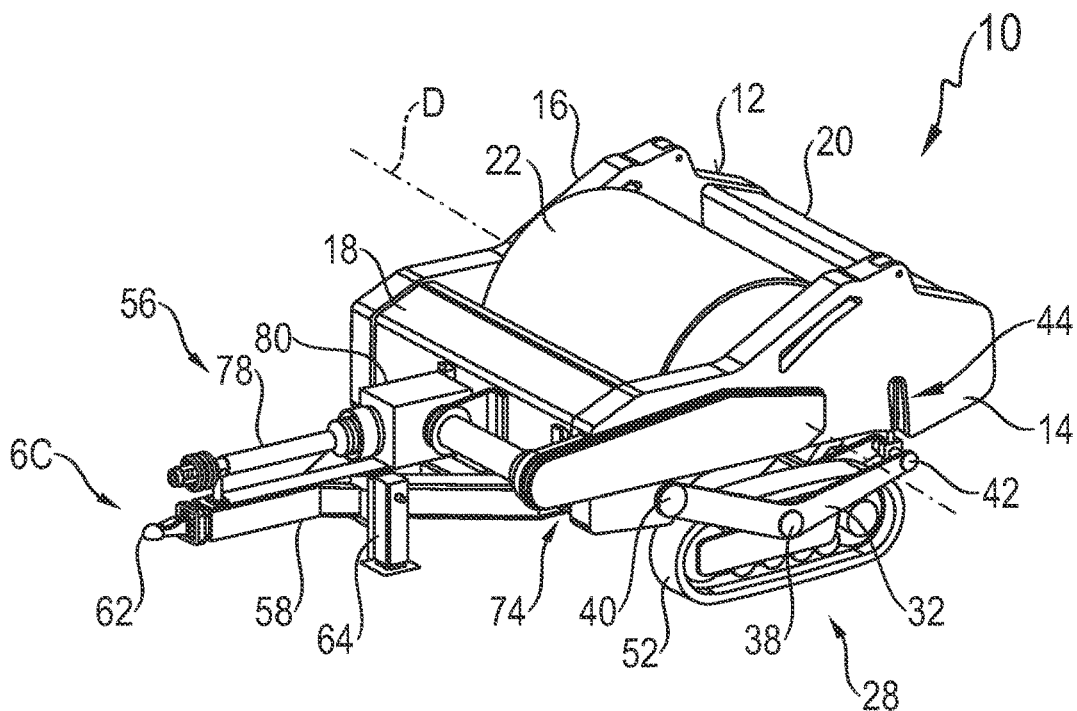
FIG. 2 shows a perspective view of the soil processing machine of FIG. 1.

FIG. 1 to 4 show a soil processing machine generally designated with 10, which, as explained below, is designed as a drawn, i.e. not self-propelled, machine.

The soil processing machine 10 comprises a machine frame 12 having two longitudinal members 14, 16 disposed spaced from each other transversely to a machine longitudinal direction L, extending substantially in the machine longitudinal direction L. At the end regions of the longitudinal members 14, 16 positioned in the machine longitudinal direction L, these are, for example, connected by screwing and/or welding to two transverse members 18, 20 extending substantially transversely to the machine longitudinal direction L and spaced from each other in the machine longitudinal direction L.

A soil processing roller 22, also commonly referred to as a drum, is disposed in the interior of the machine frame 12 enclosed by the longitudinal members 14, 16 and transverse members 18, 20. In the exemplary embodiment shown, the soil processing roller 22 has a roller shell 24 having a substantially smooth, closed outer contour. Above member units not shown in the figures, the soil processing roller 22 is rotatably supported about a roller rotation of axis D on the longitudinal members 14, 16. It should be noted at this point that, depending on the purpose, the soil processing roller 22 may also be formed with a different outer contour, for example, for breaking up the subsoil with a structured and/or open outer contour.

A chassis assembly, commonly referred to with 26, is provided on the machine frame 12 in order to be able to move the soil processing machine 10 over the soil to be processed when performing a soil processing procedure. The chassis assembly 26 substantially supplies a lifting assembly 27 and comprises two chassis units 28, 30. Each of these chassis units 28, 30 designed as caterpillar chassis 34, 36 is provided assigned to one of the two longitudinal members 14, 16 or supported thereon in such a manner that the two chassis units 28, 30 are spaced apart in the direction of the roller rotation of axis D and between them accommodate the soil processing roller 22.

Each of the two chassis units 28, 30 is adjustably supported on the assigned longitudinal member 14, 16 substantially in a height direction H, which means that a relative positioning between chassis units 28, 30 on the one hand and machine frame 12 on the other hand in the height direction H is variable. For this purpose, each chassis unit 28, 30 has a chassis member 32 comprising, for example, two member elements, wherein the two member elements of a respective chassis member 32 accommodate between them the caterpillar chassis 34 or 36 of a respective chassis unit 28 or 30 or pivotally support it in a coupling region 38 provided in the machine longitudinal direction L approximately centrally provided on the respective chassis member 32 about an axis substantially parallel to the roller rotation of axis D.

In an end region which is close to the transverse member 18 and provides a coupling region 40, the chassis members 32 are pivotally mounted on the assigned longitudinal member 14 or 16 about a pivot axis substantially parallel to the roller rotation of axis D. In an end region which is close to the transverse member 20 and provides a height adjustment region 42, the chassis members 32 are adjustably supported substantially in the height direction H with respect to the longitudinal member 14, 16 assigned in each case via a height adjustment assembly commonly referred to with 44. As indicated, for example, in FIGS. 1 and 2, such a height adjustment assembly 44 may comprise a piston/cylinder unit 46, wherein, for example, its piston rod may be pivotally mounted on the height adjustment region 42 of a respective chassis member 32, while the cylinder, which is not recognisable in the figures, may be pivotally mounted on the assigned longitudinal member 14.

It should be pointed out that as an alternative to the embodiment of the height adjustment assembly 44 as piston/cylinder units 46, these can also be designed as spindle units, in which a spindle nut formed with an internal thread can be moved by relative rotational movement in the longitudinal direction of the spindle rod on an externally threaded spindle rod. The spindle nut or the spindle rod may be assigned to a drive which can trigger the rotational movement for varying the relative position.

In the figures, it can be seen that the roller rotation of axis D is positioned approximately vertically above the coupling region 38 in the machine longitudinal direction and is thus also positioned in the machine longitudinal direction L between a first footprint region longitudinal end 48 and a second footprint region longitudinal end 50 of the chassis units 28, 30. Such a footprint region A formed between these two footprint region longitudinal ends 48, 50 substantially defines that longitudinal region over which the caterpillar tracks 52 of the caterpillar chassis 34, 36 of the chassis units 28, 30 are in contact with the soil. By positioning the roller rotation of axis D near the coupling region 38 and also in the footprint region A, a uniform loading of the caterpillar chassis 34, 36 of the chassis units 28, 30 that avoids substantial tilting moments is ensured.

The chassis units 28, 30 could alternatively each be formed with a plurality of successive wheels in the machine longitudinal direction L. In each such chassis unit comprising a plurality of wheels, the footprint region A may be formed by the surface area formed between the footprints of the two wheels positioned end-to-end in the machine longitudinal direction L and also comprising these footprints.

Figure 3:
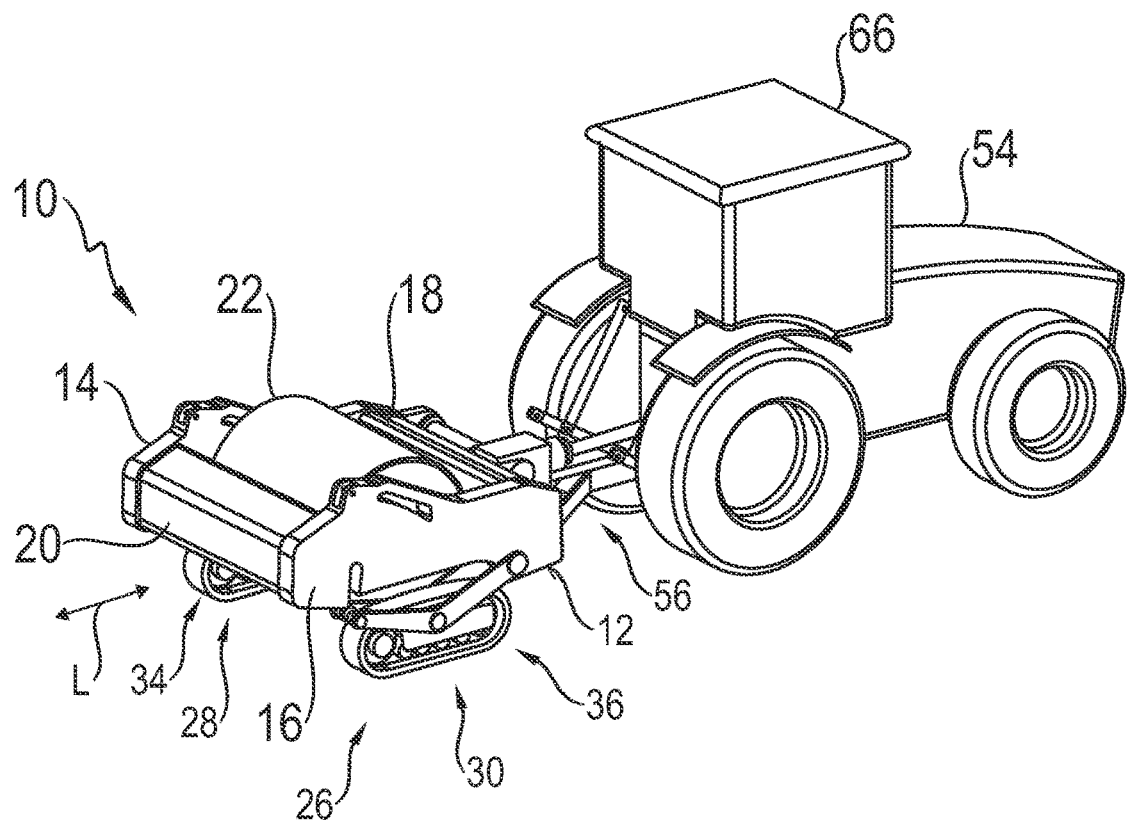
FIG. 3 shows a soil processing train with the soil processing machine of FIG. 1.
Figure 4:
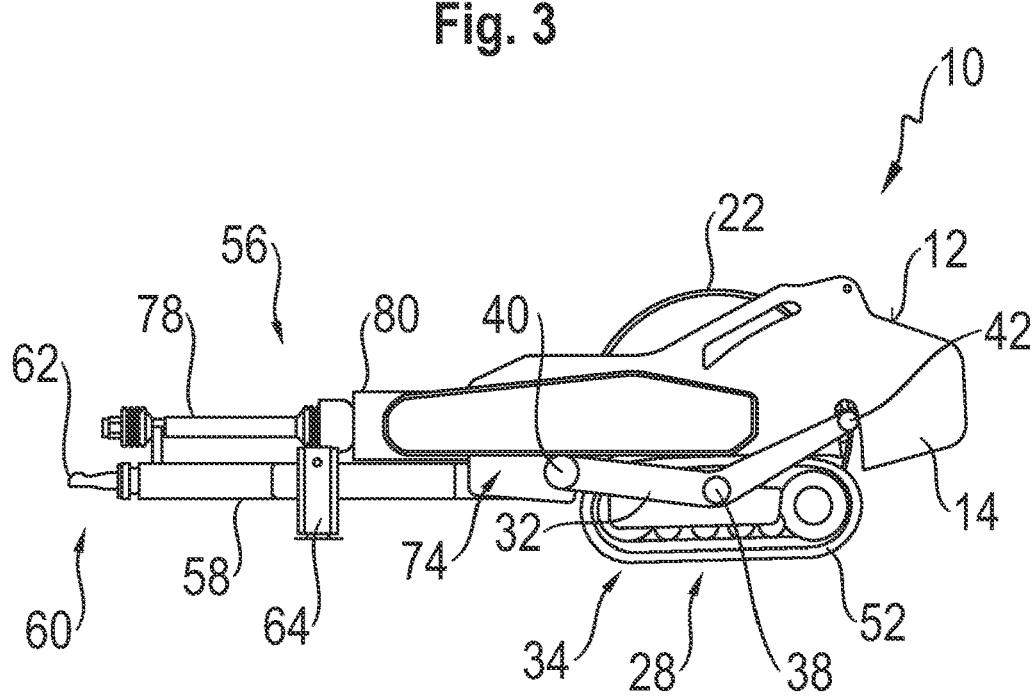
FIG. 4 shows another side view of the soil processing machine of FIG. 1.

In order to be able to couple the soil processing machine 10 to a traction machine 54 shown in FIG. 3 and thus to be able to move the soil processing machine 10 substantially in the machine longitudinal direction L using the traction machine 54 designed as a tractor in the example shown, the soil processing machine 10 has a coupling assembly commonly referred to with 56. The coupling assembly 56 comprises a drawbar unit 58 rigidly, i.e. substantially non-pivotally, connected to the machine frame 12. In its end region remote from the machine frame 12, the drawbar unit 58 supports a coupling formation 60, which in the example shown is designed as a coupling socket 62 and can be coupled in the manner of a ball head trailer coupling to a counter-coupling formation provided on the traction machine 54, which, in the embodiment of the coupling formation 60 as a coupling socket 62, is designed as a coupling ball. Furthermore, a support 64 can be provided on the drawbar unit 58, which can be telescoped substantially in the height direction H and thus support the coupling assembly 56 or the drawbar unit 58 thereof in a state in which the coupling assembly 56 is not coupled to the traction machine 54 and thus can maintain the drawbar unit 58 at an appropriate height for producing the coupling state.

When the soil processing machine 10 is coupled to the traction machine 54, in particular the piston/cylinder units 46 of the respective height adjustment assembly 44 can be coupled to the hydraulic system of the traction machine 54. Controls may be provided on the traction machine 54 which allow the operator sitting in the operating position 66 of the traction machine 54 to act on the height adjustment assemblies 44 assigned to the two chassis units 28, 30 and to set their height position in particular independently with respect to the machine frame 12. FIG. 5 to 8 show various positions of the chassis units 28, 30 with respect to the machine frame 12 achievable during the operation of the soil processing machine 10.

Figure 5:
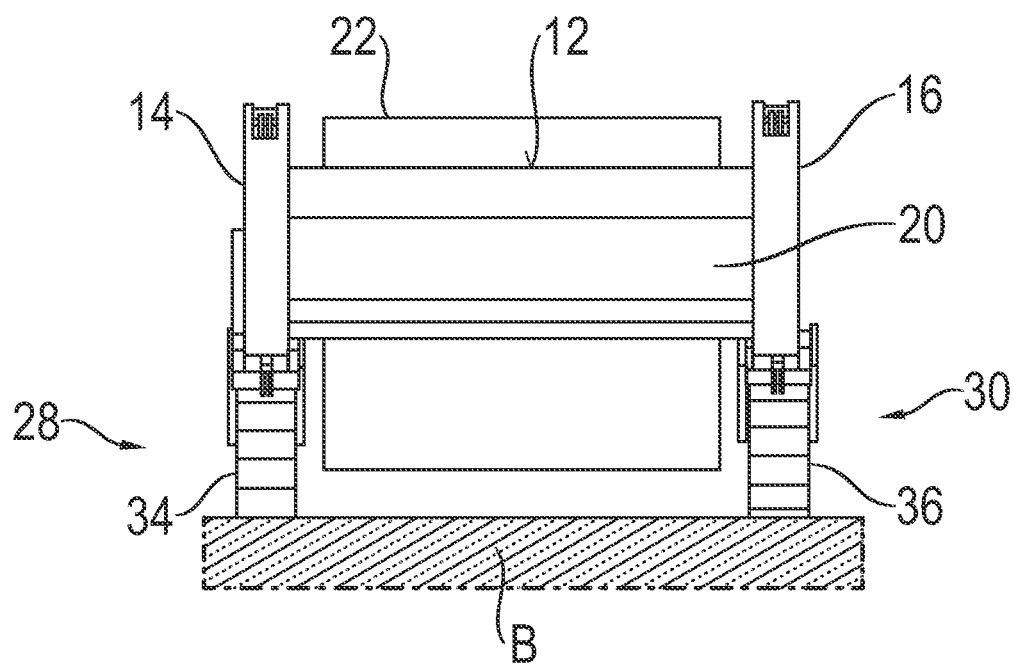
FIG. 5 shows a rear view of the soil processing machine of FIG. 1 with the soil processing roller lifted up from the soil.

FIG. 5 shows a state in which, by extending the piston/cylinder units 46, the machine frame 12 is raised to the maximum extent, for example, with respect to the chassis units 28, 30. By raising the machine frame 12, the soil processing roller 22, which is rotatably supported on this about the roller rotation of axis D, but unchangeable with respect to the machine frame 12 in its height position, is likewise also raised, so that it is out of contact with the soil B. In this state, the soil processing machine 10 can be moved by the traction machine 54, for example, to a soil to be processed, without the soil processing roller 22 coming into contact with the soil B.

Figure 6:
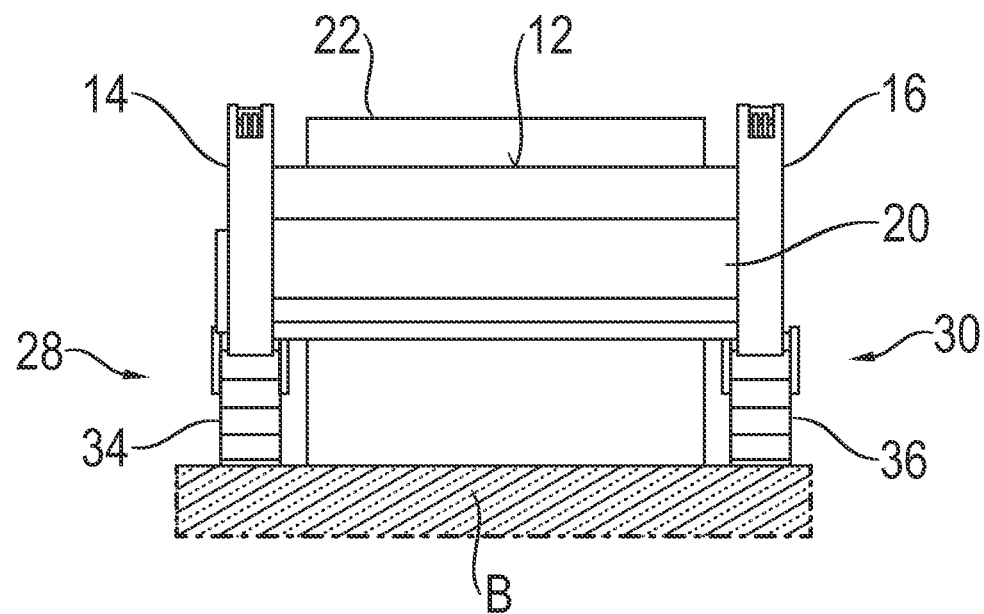
FIG. 6 shows a view corresponding to FIG. 5 with the soil processing roller raised off the soil.

FIG. 6 illustrates a state in which, by retracting the piston/cylinder units 46, the machine frame 12 is lowered with respect to the chassis units 28, 30 to such an extent that both the soil processing roller 22 and the two chassis units 28, 30 rest on the soil B. Thus, the load provided by the weight of the entire soil processing machine 10 is distributed on that surface area in which the soil processing roller 22 is in contact with the soil and that surface area in which the caterpillar tracks 52 of the chassis units 28, 30 are in contact with the soil B. Furthermore, this can suppress a rocking of the machine frame 12.

Figure 7:
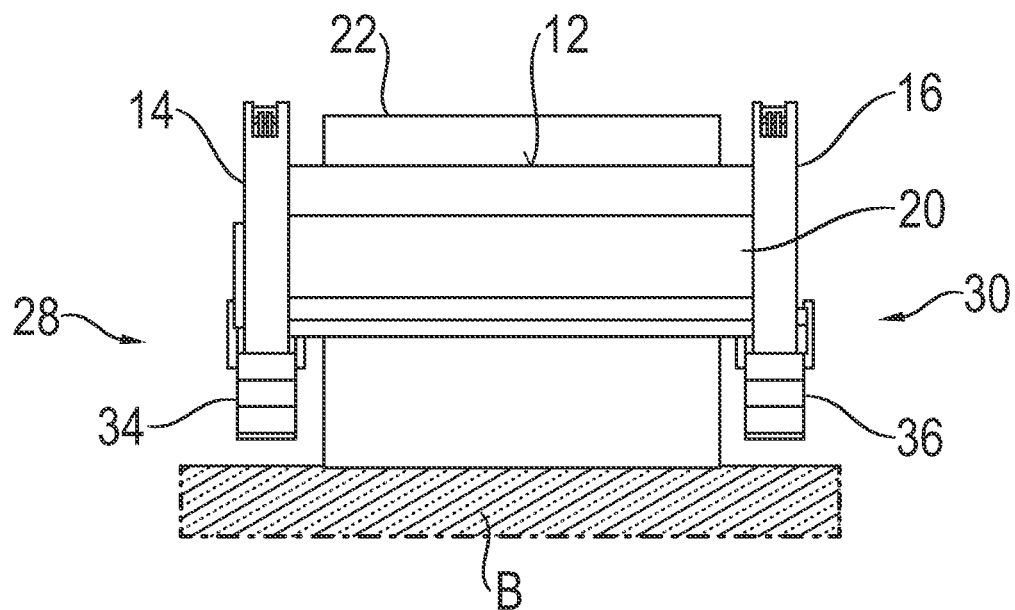
FIG. 7 shows a view corresponding to FIG. 5 with chassis units lifted up from the soil.

FIG. 7 illustrates a state in which, by further retraction of the piston/cylinder units 46, the two chassis units 28, 30 are raised with respect to the machine frame 12 so that they no longer touch the soil B. In this state, substantially the entire weight of the soil processing machine 10 is supported on the soil B via the soil processing roller 22, so that in this state, the bearing load applied by the soil processing roller 22 to the soil B corresponds to a maximum bearing load of the soil processing roller 22.

Figure 8:
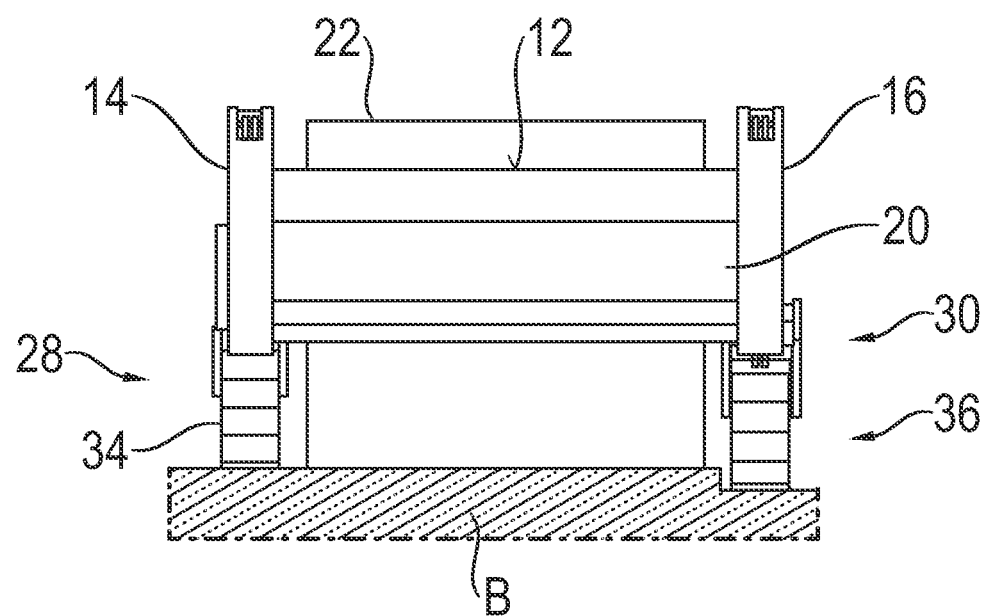
FIG. 8 shows a view corresponding to FIG. 6 with varying soil level.

FIG. 8 illustrates a state in which, in a manner corresponding to the state of FIG. 6, the bearing load applied by the soil processing roller 22 to the soil B is reduced relative to the maximum bearing load in that a portion of the weight of the soil processing machine 10 is borne by the chassis units 28, 30 or supported with respect to the soil B. However, the soil B in FIG. 8 is uneven. In order to achieve a uniform load distribution transversely to the machine longitudinal direction L, i.e. in the direction of the roller rotation of axis D, the piston/cylinder unit 46 is further extended in the chassis unit 30 shown on the right in FIG. 8 than in the chassis unit 28 shown on the left in FIG. 8, so that, adapted to the existing difference in level of the soil B, the two chassis units 28, 30 are lowered or raised differently with respect to the machine frame 12 of the soil processing machine 10 and the machine frame 12 or the soil processing roller 22 can be positioned substantially parallel to the underlying region of the soil B. Such differences in level can also occur, for example, when on comparatively soft soil, the chassis units 28, 30 accommodating a portion of the bearing load sink into the soil B to different degrees, which can be compensated by corresponding control of the assigned piston/cylinder units 46.

Figure 9:
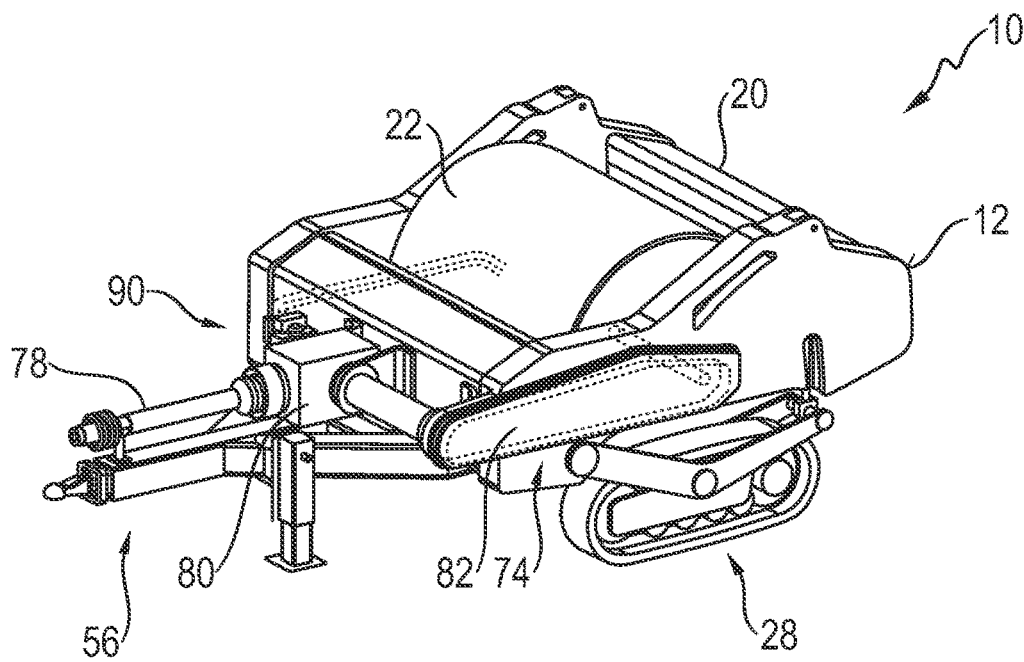
FIG. 9 shows another perspective view of a non-self-propelled soil processing machine.
Figure 10:
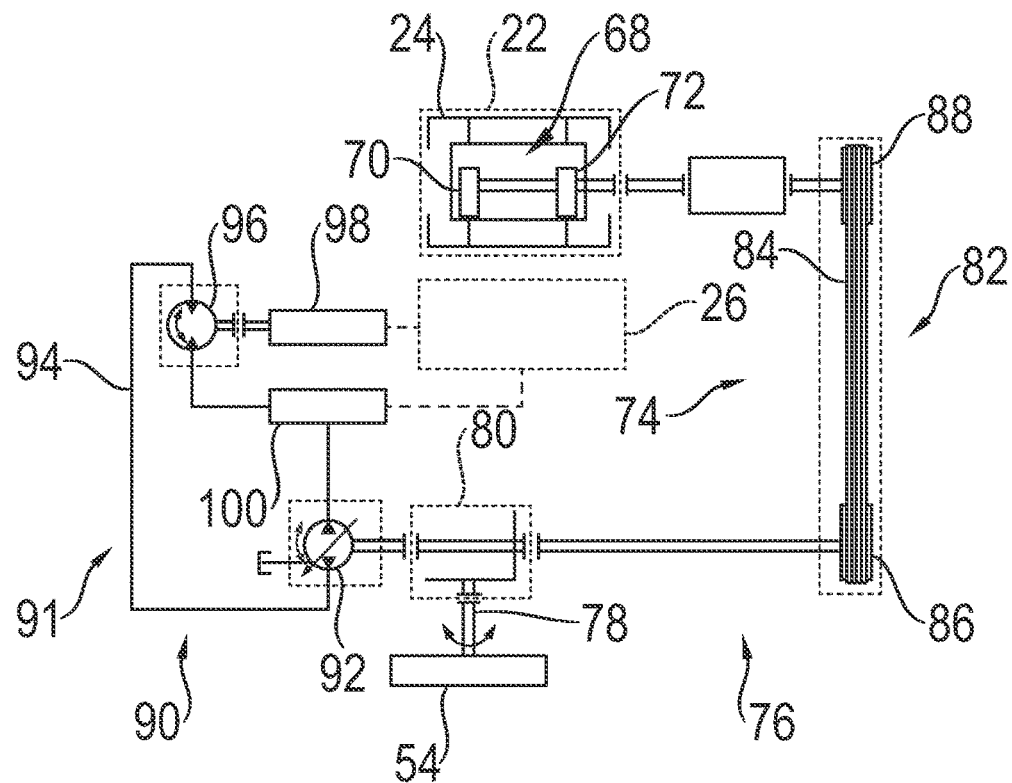
FIG. 10 shows a block diagram illustrating the power transmission in the soil processing machine of FIG. 9.

FIGS. 9 and 10 illustrate that the soil processing roller 22 may be assigned to an oscillation mechanism commonly assigned to 68. In the example shown, the oscillation mechanism 68 comprises two imbalance masses 70, 72 which are disposed in the interior of the soil processing roller 22 and, for example, can be rotated about the roller rotation of axis D. When the imbalance masses 70, 72 are driven to rotate about the roller rotation of axis D by an imbalance drive, commonly referred to with 74, they generate a force acting substantially orthogonal to the roller rotation of axis, by which the soil processing roller 22 is accelerated correspondingly orthogonal to the roller rotation of axis D. Due to such a force effect, also referred to as a vibration, when a processing procedure is performed, an increased interaction between the soil processing roller 22 and the soil to be processed by it, beyond the static bearing load of soil processing roller 22, which is advantageous in particular when compacting, in particular when such an acceleration or force effect is provided substantially in the vertical direction, i.e. in the height direction H.

In the construction of the soil processing machine 10 shown in FIG. 1 to 10, the imbalance drive 74 is designed as a purely mechanical transmission mechanism 76. This comprises a drive shaft 78 which can be coupled to a power take-off shaft of the traction machine 54, a gear unit assembly 80 formed as an angle gear unit and a belt drive 82 with a transmission belt 84 between a drive disk 86 coupled to the gear unit 80 and an output disk 88 coupled to the imbalance masses 70, 72. Thus, through a drive unit such as a diesel engine provided on the traction machine 54, the energy required to drive the imbalance masses 70, 72 can be provided or picked up via the mechanical transmission 76 of the power take-off shaft of the traction machine 54 and introduced into the imbalance masses 70, 72.

While in the embodiment shown in FIG. 1 to 4, the soil processing machine 10 is designed with free-running chassis units 28, 30, thus the entire energy or force moving the soil processing machine 10 in the machine longitudinal direction L is applied by the traction machine 54 pulling or sliding this and transmitted via the coupling assembly 56, in the construction of the chassis assembly 26 shown in FIGS. 9 and 10, i.e. the two chassis units 28, 30 of the same, one is assigned as a chassis pressure fluid drive 91 of the designed chassis drive 90. This comprises a pressure fluid pump 92 coupled to the gear unit 80, preferably with a variable delivery volume, a pressure fluid circuit 94 and a pressure fluid motor 96 that can be acted upon by the pressure fluid circulating in the pressure fluid circuit 94. As indicated by a block 98, the pressure fluid motor 96 is coupled to a respective caterpillar chassis 34, 36 of the chassis assembly 26 to thereby drive the respective caterpillar tracks 52 to move. It goes without saying that such a pressure fluid motor 96 acting in assignment to the respective caterpillar chassis 34, 36 is provided in each of the two chassis units 28, 30.

As illustrated by a block 100, the pressure fluid provided in the pressure fluid circuit 94 may also be used for other functions. Thus, for example, this pressure fluid can also be used to extend or retract the respectively assigned piston/cylinder units 46 for raising or lowering the machine frame 12 with respect to the chassis units 28, 30. For this purpose, respective valves can be assigned to these piston/cylinder units 46, which can be activated by the already mentioned control elements on the traction machine 54 for the supply or removal of pressure fluid to and from the piston/cylinder units 46. The pressure fluid can also be used to activate tensioning systems provided on the respective caterpillar chassis 34, 36 for the caterpillar tracks 52 of the same and/or to activate respective service brakes of the caterpillar chassis 34, 36.

It should be noted that in an alternative embodiment, as already explained above, to operate all of these system areas operating with pressure fluid, a pressure fluid circuit of the tractor 54 can also be accessed directly, so a pressure fluid pump corresponding to the pressure fluid pump 92 may be provided on the traction machine 54 to provide the pressure fluid required for the pressure fluid circuit 94.

Figure 11:
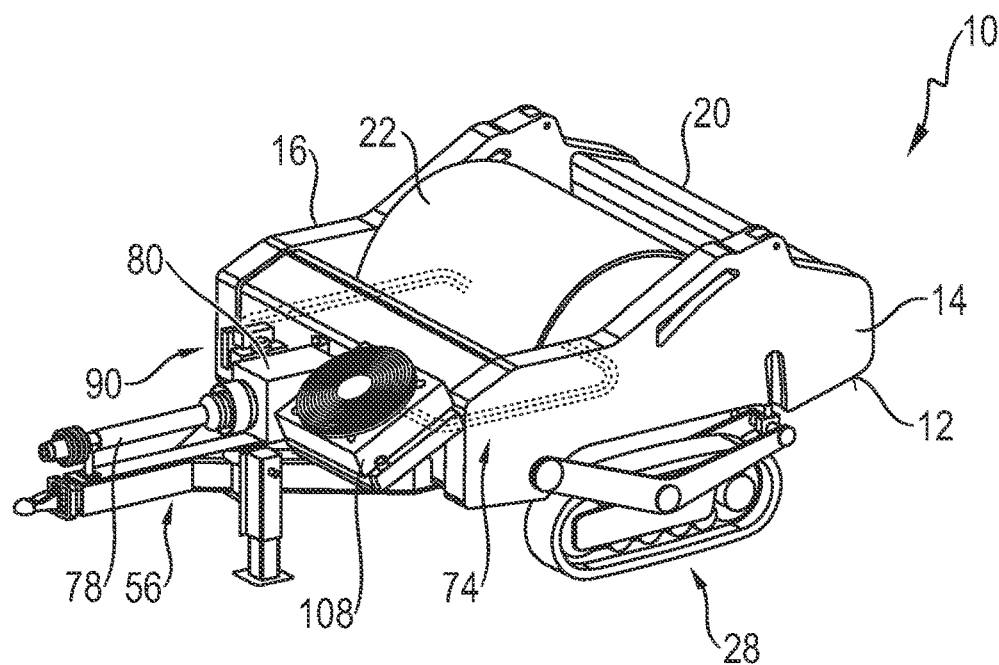
FIG. 11 shows another perspective view of a non-self-propelled soil processing machine.
Figure 12:
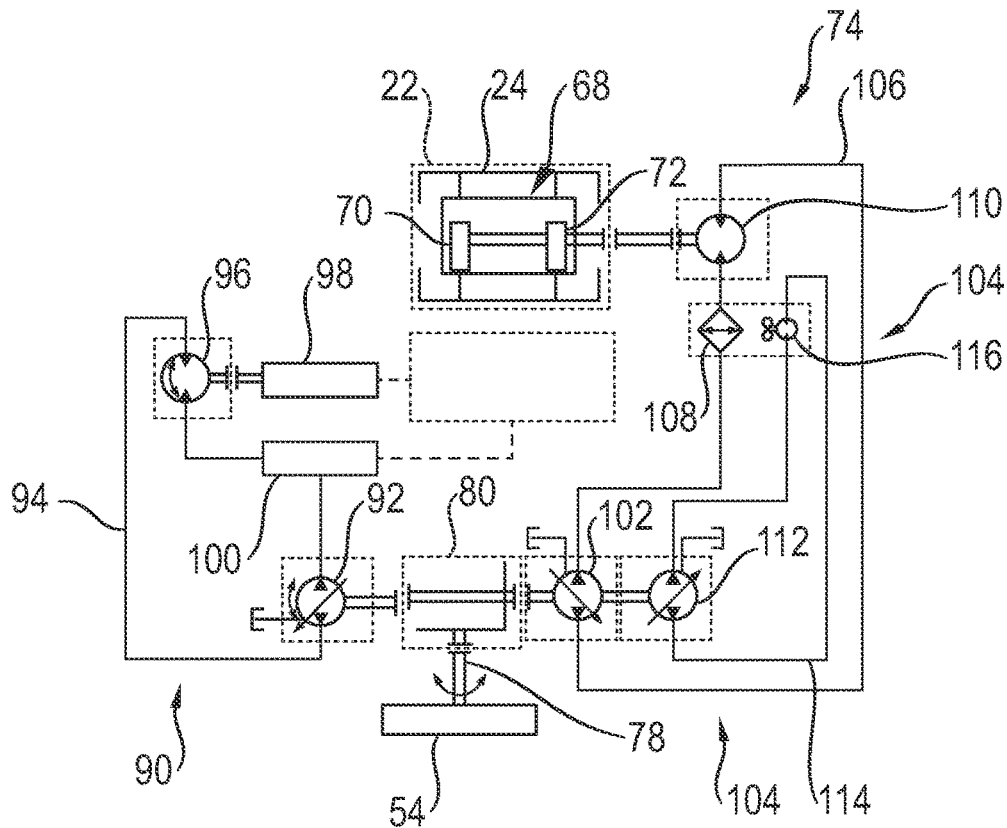
FIG. 12 shows a block diagram illustrating the power transmission in the soil processing machine of FIG. 11.

In an alternative embodiment shown in FIGS. 11 and 12, the imbalance drive 74 also works with pressure fluid. A pressure fluid pump 102 of the imbalance pressure fluid drive 104 is coupled to the gear unit 80. A pressure fluid circuit 106 directs the pressure fluid to or from a pressure fluid motor 110 via, for example, a cooler assembly 108. This in turn is coupled to the imbalance masses 70, 72 and can drive them to rotate. Another pressure fluid pump 112 delivers pressure fluid in another pressure fluid circuit 114 to a fan unit 116, which can deliver cooling air through the cooler assembly 108.

An advantage of this embodiment is that, in particular in the embodiment of the pressure fluid pump 102 with adjustable delivery volume, the rotational speed of the pressure fluid motor 110 and thus also the rotational speed of the imbalance masses 70, 72 can be adjusted easily and precisely and in particular independently of the rotational speed of a drive unit of the traction machine 54. This makes it possible to operate the oscillation mechanism 68 with a rotational speed of the imbalance masses 70, 72 which is suitable for a respective soil processing procedure, and thus a suitable oscillation frequency.

It goes without saying that such a construction of the imbalance drive 74 incorporating the pressure fluid circuit 106 can also be used if, as shown in FIG. 1 to 4, no chassis drive is assigned to the chassis units 28, 30. It should also be pointed out that, of course, when there are a plurality of system areas to be operated with pressure fluid on the soil processing machine 10, such as, for example, the chassis drive 90 on the one hand and the imbalance drive 74 on the other hand, a portion of these system areas for providing the pressure fluid may be coupled directly to the pressure fluid circuit of the traction machine 54, while another portion of these system areas is operated by a pressure fluid circuit provided exclusively on the soil processing machine 10, whose pressure fluid pump or pressure fluid pumps can be operated mechanically, for example via the coupling to a power take-off shaft on the traction machine 54.

With a soil processing machine, as described above, various particularly advantageous states can be set in the soil processing operation. Thus, as described above with particular reference to FIG. 12, an influence on the operating characteristic of the soil processing roller 22 can be achieved by adjusting the rotational speed of the imbalance masses 70, 72 and thus the oscillation frequency provided by the oscillation mechanism 68.

The operation of the oscillation mechanism 68 can be performed such that at the beginning of a soil processing procedure, the soil processing roller 22 is brought, for example, into the positioning shown in FIG. 5, in which it has no contact with the soil B to be processed. In this state, it may then be started to direct a drive torque to the imbalance masses 70, 72 and to bring their rotational speed, for example, in the direction of the rotational speed to be provided for the soil processing operation. In this state, since the soil processing roller 22 has no contact with the soil B, no vibration energy provided by the oscillation mechanism 68 is dissipated into the soil B, even when increasing the rotational speed of the imbalance masses 70, 72. As a result, the energy to be applied to achieve or set the desired speed for the soil processing operation can be reduced or the desired rotational speed can be achieved more quickly. If the soil processing roller 10 is then in or near the state provided for the processing procedure to be performed, the chassis units 28, 30 can be raised with respect to the machine frame 12 and the machine frame 12 can thus be lowered toward the soil B, so that the soil processing roller 22 comes into contact with the soil to be processed for the processing procedure then to be performed.

It should be noted that in this start phase of a soil processing procedure, for example, the state shown in FIGS. 6 and 8 can be set, in which the soil processing roller 22 is in contact with the underlying soil B, but only a portion of the bearing load is provided via the soil processing roller 22. Even in this state, in the start phase, the transfer of energy from the soil processing roller 22 to the soil B can be reduced and thus the energy required for activating the oscillation mechanism 68 can be lowered.

The bearing load of the soil processing roller 22 can then be set or varied at the start of the soil processing procedure to be performed or even during such a soil processing procedure by adjusting the height position of the two chassis units 28, 30 with respect to the machine frame 12. For example, when the chassis units 28 are brought to the state shown in FIG. 7, the soil processing roller 22 provides the maximum bearing load, so that substantially the entire weight of the soil processing machine 10 is supported on the soil B via the soil processing roller 22. In this state, the interaction of the soil processing roller 22 and in particular the oscillation mechanism 68 provided therein with the soil B is maximum, while in the state shown in FIG. 5, in which the soil processing roller 22 is not in contact with the soil B, this interaction is minimal, namely zero. By varying the bearing load provided by the chassis units 28, 20, it is then possible to vary this interaction of the soil processing roller 22 with the soil B between a minimum value, namely the value zero (state of FIG. 5), and a maximum value achieved in the state of FIG. 7. In this way, in addition to the variation of the oscillation frequency, the ability to induce oscillation energy into the soil B may be adjusted so that, for example, when a greater proportion of the bearing load is provided by the chassis units 28, 30, a substantial input of vibrational energy into the soil B is made only in the region of the oscillation amplitude peaks of the soil processing roller 22 or the oscillation mechanism 68. This state can then be achieved, in particular, when the soil processing roller 22 is kept by the chassis units 28, 30 at a small distance from the soil B and the soil processing roller 22 is periodically moved up and down by the oscillations generated by the oscillation mechanism 68 and only comes into contact with the soil when striking periodically with maximum displacement.

Figure 13:
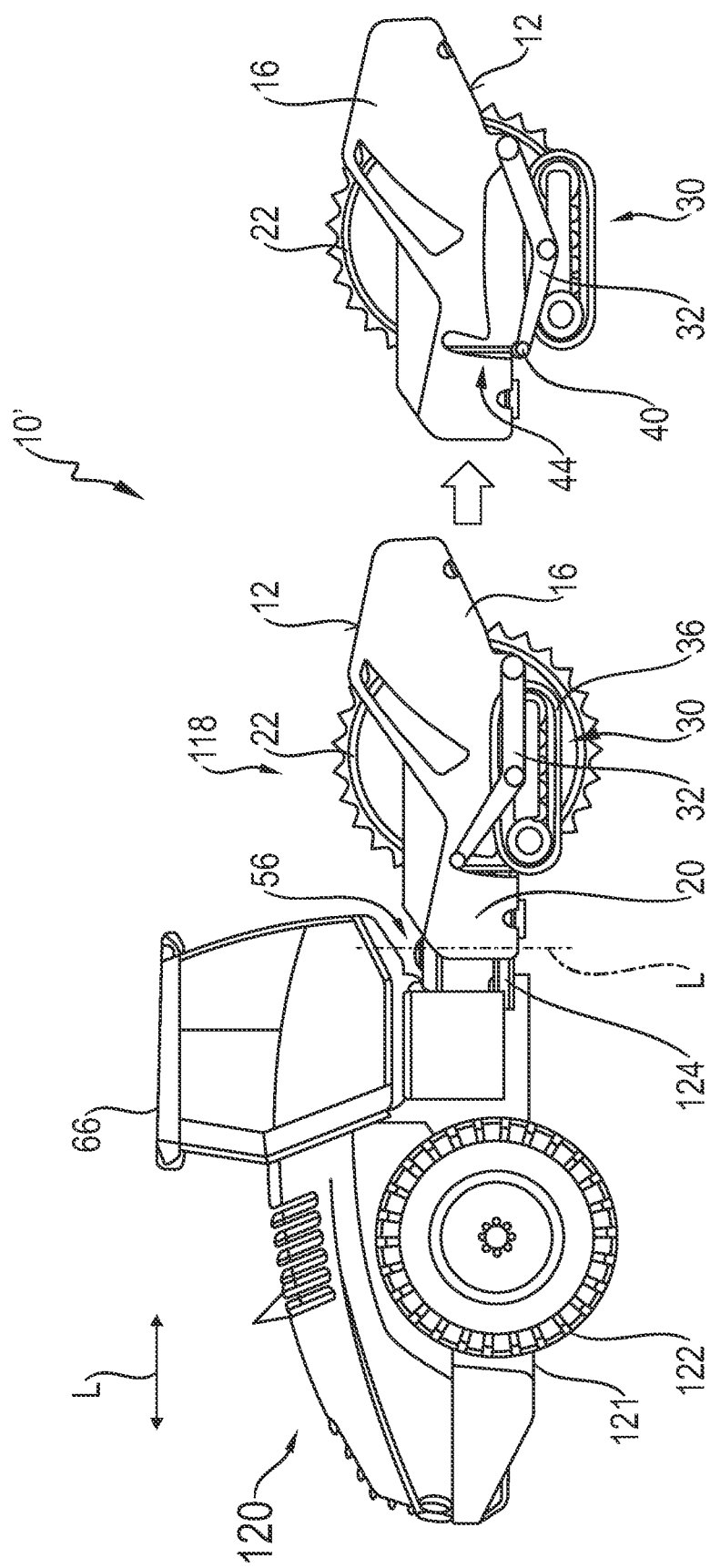
FIG. 13 shows a side view of a self-propelled soil processing machine.

FIG. 13 illustrates the principles of the present invention previously explained with reference to a non-self-propelled soil processing machine based on a self-propelled processing machine 10', formed as a so-called compactor.

This soil processing machine 10' comprises a front end 118, which substantially comprises or is provided by the machine frame 12 described above. On the machine frame 12, the soil processing roller 22 is rotatably supported about the roller rotation of axis. The machine frame 12 bears on its longitudinal members, of which only the longitudinal member 16 can be seen in FIG. 13, the chassis units, of which the chassis unit 30 with its caterpillar chassis 36 assigned to the longitudinal member 16 can be seen in FIG. 13. In the exemplary embodiment shown in FIG. 13, the soil processing roller 22 is designed with a plurality of bits provided on the outer circumference thereof as a crushing roller and can be used to break up rocky soil, for example.

The soil processing machine 10' further comprises a rear end 120, providing a further machine frame 121, on which a drive unit, for example a diesel internal combustion engine, is provided. In order to move the soil processing machine 10' in the machine longitudinal direction L, driven wheels 122 are provided on the rear end 120 in the illustrated example. Instead of the driven wheels 122 provided on both sides of the rear end 120, another soil processing roller could also be provided on this, drivable by the drive unit for rotation and thus for moving the soil processing machine 10' forward.

The coupling assembly 56 of the soil processing machine 10 comprises a steering articulation assembly 124 via which the machine frame 12 or the front end 118 is pivotally coupled to the rear end 120 about a steering pivot axis L. The steering pivot movement may be caused by one or a plurality of piston/cylinder units acting between the front end 118 and the rear end 120, such that the self-propelled soil processing machine 10' may be steered by pivoting the front end 118 with respect to the rear end 120.

Also in the case of the self-propelled soil processing machine 10 illustrated in FIG. 13, the machine frame 12 can be raised or lowered by the variation of the height position with respect to the machine frame 12 illustrated in this figure, as can the soil processing roller 22 rotatably supported on the machine frame 12 with respect to the underlying soil, in order, as described above with reference to FIG. 5 to 8, to be able to adjust or change the various positionings of the soil processing roller 22 with respect to the soil and thus also the various operating states described above, in particular at the start of a soil processing procedure and also during a soil processing procedure. In this case, the introduction of energy in particular for driving the imbalance masses of the oscillation mechanism can be carried out in a conventional manner, as is known in such soil processing machines designed in particular as vibration rollers having an oscillation mechanism disposed in the interior of a soil processing roller. A drive motor, able to be driven for example by pressure fluid, may therefore be assigned to such an oscillation mechanism.

The invention claimed is:

1. A soil processing machine, comprising:
a machine frame having two longitudinal members positioned parallel to a machine longitudinal direction and spaced from each other transversely to the machine longitudinal direction, and two transverse members positioned extending transversely to the machine longitudinal direction and spaced from each other in the machine longitudinal direction,
a soil processing roller supported on the longitudinal members such as to be rotatable about a roller rotational axis and positioned between the transverse members in the machine longitudinal direction,
a coupling assembly for coupling the machine frame to another machine frame of the soil processing machine or to another machine,
a chassis assembly comprising at each one of the two longitudinal members a chassis unit, each one of the two chassis units comprising a caterpillar chassis supported on one of the two longitudinal members such as to be height adjustable relative to the one of the longitudinal members, the caterpillar chassis of the two chassis units being independently height adjustable.

2. The soil processing machine according to claim 1, wherein each chassis unit is pivotally coupled in a coupling region to one of the longitudinal members and is height-adjustably supported in a height adjustment region disposed at a distance with respect to the coupling region in the machine longitudinal direction with respect to the longitudinal member via a height adjustment assembly.

3. The soil processing machine according to claim 2, wherein the height adjustment assembly comprises a piston/cylinder unit or a spindle unit.

4. The soil processing machine according to claim 3, wherein each chassis unit comprises a chassis member pivotally coupled to the longitudinal member in the coupling region and coupled to the height adjustment assembly in the height adjustment region.

5. The soil processing machine according to claim 1, wherein each chassis unit has a soil processing machine footprint region extending in the machine longitudinal region, and in that the roller rotation of axis is positioned in the machine longitudinal direction between a first footprint region longitudinal end and a second first footprint region longitudinal end.

6. The soil processing machine according to claim 1, wherein the soil processing roller comprises an oscillation mechanism having at least one imbalance mass disposed in the interior of the soil processing roller and rotatable about an imbalance axis of rotation.

7. The soil processing machine according to claim 6, wherein an imbalance drive drives the at least one imbalance mass.

8. The soil processing machine according to claim 7, wherein the imbalance drive comprises an imbalance pressure fluid drive having a pressure fluid pump and a pressure fluid motor coupled to the pressure fluid pump via a pressure fluid circuit.

9. The soil processing machine according to claim 7, wherein the imbalance drive comprises a mechanical transmission mechanism which transmits a drive torque from a drive motor to the at least one imbalance mass.

10. The soil processing machine according to claim 1, wherein the chassis assembly comprises a chassis drive for driving the soil processing machine in the machine longitudinal direction.

11. The soil processing machine according to claim 10, wherein the chassis drive comprises a chassis pressure fluid drive having a pressure fluid pump and a pressure fluid motor coupled to the pressure fluid pump via a pressure fluid circuit.

12. The soil processing machine according to claim 1, wherein the soil processing machine is configured to be coupled to a traction machine for moving in the machine longitudinal direction by the coupling assembly.

13. The soil processing machine according to claim 12, wherein the coupling assembly comprises a drawbar connected to the machine frame, having a coupling formation for coupling to a counter-coupling formation provided on the traction machine.

14. The soil processing machine according to claim 7, wherein the imbalance drive is configured to be coupled to a drive unit of a traction machine.

15. The soil processing machine according to claim 10, wherein the chassis drive is configured be coupled to a drive unit of a traction machine.

16. The soil processing machine according to claim 1, wherein a drive unit is provided on the another machine frame providing a rear part of the soil processing machine, and that the coupling assembly comprises a steering articulation assembly for the pivotal coupling of the machine frame providing a front part of the soil processing machine to the another machine frame about a steering articulation axis.

17. A soil processing train, comprising a traction machine and a soil processing machine according to claim 1 coupled to the traction machine.

18. A method for operating a soil processing machine, the soil processing machine including:
a machine frame having two longitudinal members positioned parallel to a machine longitudinal direction and spaced from each other transversely to the machine longitudinal direction, and two transverse members positioned extending transversely to the machine longitudinal direction and spaced from each other in the machine longitudinal direction,
a soil processing roller supported on the longitudinal members such as to be rotatable about a roller rotational axis and positioned between the transverse members in the machine longitudinal direction,
a coupling assembly for coupling the machine frame to another machine frame of the soil processing machine or to another machine,
a chassis assembly comprising at each one of the two longitudinal members a chassis unit, each one of the two chassis units comprising a caterpillar chassis supported on one of the two longitudinal members such as to be height adjustable relative to the one of the longitudinal members, the caterpillar chassis of the two chassis units being independently height adjustable,
the soil processing machine further including, an oscillation mechanism having at least one imbalance mass disposed in the interior of the soil processing roller rotatable about an imbalance rotation of axis and a lifting assembly including the chassis assembly, wherein the soil processing roller is positionable in and out of contact with a soil underlying the soil processing roller by the lifting assembly and/or a bearing load exerted by the soil processing roller on the soil underlying the soil processing roller is variable,
wherein the method comprises:
a) at the beginning of a soil processing procedure, operating the lifting assembly to position the soil processing roller such that the soil processing roller is out of contact with the underlying soil or a bearing load exerted by the soil processing roller on the underlying soil is reduced with respect to a maximum bearing load,
b) after implementing step a), putting the oscillation mechanism into operation,
c) after implementing step b), operating the lifting assembly such that the soil processing roller comes into contact with the underlying soil or a bearing load exerted by the soil processing roller on the underlying soil is increased.

19. A method for operating a soil processing machine, the soil processing machine including:
a machine frame having two longitudinal members positioned parallel to a machine longitudinal direction and spaced from each other transversely to the machine longitudinal direction, and two transverse members positioned extending transversely to the machine longitudinal direction and spaced from each other in the machine longitudinal direction,
a soil processing roller supported on the longitudinal members such as to be rotatable about a roller rotational axis and positioned between the transverse members in the machine longitudinal direction,
a coupling assembly for coupling the machine frame to another machine frame of the soil processing machine or to another machine,
a chassis assembly comprising at each one of the two longitudinal members a chassis unit, each one of the two chassis units comprising a caterpillar chassis supported on one of the two longitudinal members such as to be height adjustable relative to the one of the longitudinal members, the caterpillar chassis of the two chassis units being independently height adjustable,
the soil processing machine further including, a soil processing roller rotatably supported on a machine frame about a roller rotation of axis, an oscillation mechanism having at least one imbalance mass disposed in the interior of the soil processing roller rotatable about an imbalance rotation of axis, and a lifting assembly including the chassis assembly, wherein the soil processing roller is positionable in and out of contact with a soil underlying the soil processing roller by the lifting assembly and/or a bearing load exerted by the soil processing roller on the soil underlying the soil processing roller is variable,
wherein the method comprises at least one of the following steps:
a) for performing a soil processing procedure with the oscillation mechanism in operation, operating the lifting assembly such that a bearing load exerted by the soil processing roller on the underlying soil is reduced with respect to a maximum bearing load,
b) while performing a soil processing procedure with the oscillation mechanism in operation, operating the lifting assembly such that a bearing load exerted by the soil processing roller on the underlying soil is changed with respect to a maximum bearing load.

* * * * *